United States Patent
Gross, II et al.

(10) Patent No.: US 6,203,836 B1
(45) Date of Patent: *Mar. 20, 2001

(54) METHOD OF TREATING WOOD AND TREATED WOOD FOR USE IN FLAVORING AQUEOUS FOOD PRODUCTS AND RESULTING PRODUCTS

(75) Inventors: Remy F. Gross, II; Charles Barbier, both of Shreveport, LA (US)

(73) Assignee: Kairos Corporation, Shreveport, LA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/833,687

(22) Filed: Apr. 8, 1997

Related U.S. Application Data

(63) Continuation of application No. 08/449,927, filed on May 25, 1995, now abandoned, and a continuation-in-part of application No. 08/082,319, filed on Jun. 26, 1993, now abandoned.

(51) Int. Cl.$^7$ .................................................. C12G 3/07
(52) U.S. Cl. .......................... 426/422; 426/489; 426/533; 426/592
(58) Field of Search .................................. 426/489, 422, 426/424, 533, 592

(56) References Cited

U.S. PATENT DOCUMENTS

| | | | |
|---|---|---|---|
| 675,173 | * 5/1901 | Spink | 426/422 |
| 2,092,866 | * 9/1937 | Wisniewski | 426/520 |
| 2,119,234 | 5/1938 | Krebs et al. | |
| 2,132,435 | 10/1938 | Reiman | |
| 2,185,206 | 1/1940 | Little | |
| 2,347,783 | 5/1944 | Krebs | |
| 2,807,547 | * 9/1957 | Nickol | 426/312 |
| 4,350,708 | 9/1982 | Ruiz de Palacios | |
| 4,576,826 | 3/1986 | Liu et al. | |
| 4,956,194 | 9/1990 | Gos | |
| 5,102,675 | * 4/1992 | Howell et al. | 426/422 |
| 5,356,641 | 10/1994 | Bowen et al. | |

FOREIGN PATENT DOCUMENTS

| | | |
|---|---|---|
| 634108 | * 1/1995 | (EP) |
| 148829 | 11/1920 | (GB) |
| 500081 | * 2/1939 | (GB) |
| 958825 | 5/1964 | (GB) |
| 2206605 | * 1/1989 | (GB) |
| 1663022 | * 7/1991 | (SU) |

OTHER PUBLICATIONS

A. H. Rose, Alcoholic Beverges, vol. 1, Academic Press, New York, 1977, pp. 364, 606 & 676.*

Liebmann, et al., Changes in Whisky While Maturing Industrial and Engineering Chemistry vol. 35, No. 9, Sep. 1943.

Swan, James S., Maturation of Potable Spirits, Chapter 17 in Handbook of Food and Beverage Stability, Academic Press, 1986.

Baldwin, Sidney et al., Aromatic Congener Formation in Maturation of Alcoholic Distillates, J. Agr. Food Chem., vol. 15, No. 3, pp. 381–385 May–Jun. 1967.

Reazin, George H. et al. Determination of the Congeners Produced from Ethanol During Whisky Maturation, Journal of the AOAC, vol. 59, No. 4, 1976, pp. 770–776.

Reazin, George H., Chemical Mechanisms of Whiskey Maturation, Am. J. Enol. Vitic., vol. 32, No. 4, 1981, pp. 283–289.

Liebmann, A.J. et al., Changes in Whisky While Maturing, Industrial and Engineering, Chemistry, vol. 41, No. 3, Mar. 1949, pp. 534–543.

Valaer, Peter et al., Changes in Whisky Stored For Four Years, Industrial & Engineering Chemistry vol. 28, No. 1, Jan. 1936 pp. 92–105.

Nykänen, Lalli, et al., Aroma Compounds Dissolved from Oak Chips by Alcohol, Progress In Flavor Research 1984 pp. 339–346.

Baldwin, Sidney et al., Congener Development in Bourbon Whisky Matured at Various Proofs for 12 Years, Journal of the AOAC, vol. 51, No. 4, 1974, pp. 940–950.

Swan, J.S., et al., The Development of Flavour in Potable Spirits, Chemical Society Review, Chemistry of Flavour, Part IV, 1978 pp. 201–211.

* cited by examiner

*Primary Examiner*—Curtis Sherrer
(74) *Attorney, Agent, or Firm*—Timothy S. Corder; Vinson & Elkins L.L.P.

(57) ABSTRACT

Disclosed is a process for treating wood particles for use in flavoring aqueous liquids to mask undesirable taste components and to increase the extractability and reactivity of flavor enhancing components. Wood particles are contacted with a solution of aqueous ethanol, the solids separated and heated for at least fifteen minutes at temperatures up to 220° C. Also disclosed is a process for using such wood particles for treatment of aqueous liquids and aqueous liquids treated with such wood particles.

6 Claims, No Drawings

METHOD OF TREATING WOOD AND TREATED WOOD FOR USE IN FLAVORING AQUEOUS FOOD PRODUCTS AND RESULTING PRODUCTS

This application is a continuation of application Ser. No. 08/449,927, filed May 25, 1995, now abandoned. This application is a continuation-in-part of U.S. application Ser. No. 08/082,319, filed Jun. 26, 1993, now abandoned.

BACKGROUND

Many of the world's potable beverages owe their character, complexity and maturity to storage in wood containers. The products are largely, but not exclusively, spirits of distilled ethanols. Ethanolic beverages have long been flavored by contacting the ethanol containing liquid with wood and thereby extracting and reacting certain desirable flavoring components from the wood by leaching into the liquid. Included in this category are whiskies, including Scotch, Irish, bourbon, rye, Canadian, and Australian; and rum, brandy, armagnac, cognac, eau de vie and other distilled beverage bases. Wine, though not distilled, is also often matured in wood. In particular, most of the world's red wines, dessert, or appetizer wines, and some of the white wines, derive their essential characteristics from storage in wood containers. Under United States law certain ethanol beverages are required to have certain minimum periods in contact with wood.

Presently, maturation of these products is accomplished by placing the liquid in wooden casks or barrels known as tight cooperage, where it remains for weeks, months or years depending on the desired level of maturation. Of particular significance is the aging of whiskies and brandies in which years of maturation in contact with wood are required. The essential character of all these products is the result of the chemical changes that occur from contact with and the chemical interaction of their ethanolic and water content to their so-called congeners in the wood. No convenient, alternative technology of maturation has been developed.

Many woods contain flavor agents (congeners) essential and desired for beverage maturation. An extensive listing of woods with favorable characteristics appears in "Some Aspects of the Wooden Container as a Factor in Wine Maturation", chapter 12 of Chemistry of Winemaking, Singleton, V. L. (1974) at 254–275, incorporated herein by reference. All the woods cited may be used in the process disclosed hereinbelow.

Several detriments are associated with current aging processes. The first of these detriments is related to the cost and availability of the prime types and age and species of wood required to produce the best products. The scarcity, the removal of a natural resource, and the high cost of prime grades of wood have caused producers to use inferior grades of wood in many of their products with resulting lack of fullness and richness of flavor in the ethanolic beverage.

In addition to the cost of wood and labor for making barrels, there is the high inventory cost during the multi-year aging process. The ripening inventory must be stored in barrels, usually each containing no more than 180 liters of liquid, in a secure place not subject to extremes of temperature and humidity, lest the barrels leak or burst.

Yet another major detriment associated with current aging practices is the loss of liquid during the aging process, due to evaporative losses from the barrels which may approach or exceed 4% per year, depending upon storage conditions.

These and other detriments could be minimized or removed if currently available, temperature controlled, stainless steel or glass lined reactors could be used to impart the flavoring components of the wood into large batches of liquid in a process where the flavor transfer from the wood to the liquid could be completed in a matter of hours or days rather than months or years.

Because of the tremendous benefits that could be obtained by avoiding the use of long term barrel aging, there have been significant attempts made over a long period of time to find alternative methods of "aging", "maturing" or "mellowing" the flavor of the ethanolic beverage. For example, there have been attempts to load the liquid with wood chips of various sizes and of various kinds of wood. These methods have however not been successful because the liquid extracts undesirable components along with an insufficient level of desirable components.

Later attempts involved various wood particle pretreatments, such as charring, weathering or boiling the wood chips in water prior to use or combinations of these procedures. None of these methods met with success because of the unbalanced flavor and congener characteristics. A more recent variation on these attempts to circumvent the detriments associated with long term aging in wood barrels is described in Howell et al., U.S. Pat. No. 5,102,675. Howell et al. pretreats wood particles destined to flavor wine by combining a toasting procedure preceeded or followed by soaking in water or a weak (less than 10%) aqueous ethanol solution. However, wood particles treated in the described method only partially solve the problem since aging of the wine in contact with the wood particles for at least three or preferrably six months is still required.

Thus, there exists a continuing need to find an alternative to the age old maturation process that provides a flavorful beverage, that does not require a substantial period of time, that can be accomplished in standard industrial reactors, that does not entail a substantial loss of product during the manufacturing process, and that is economical.

It is therefore an object of this invention to provide a process for aging that does not require years to accomplish but days. It is an object to provide a process that does not require the skills of a barrel maker. It is an object to provide a process that does not require a wood barrel for aging. It is an object of this invention to render usable large quantities of wood wasted in conventional barrel production. It is another object to provide a process for treating wood to remove undesirable components. It is an object of this invention to provide a process for flavoring aqueous liquids. It is another object of this invention to provide a process that allows easily reproducible standards for quality control and consistent maturation of aqueous food products. Another object of this invention is to provide a process that controls and largely eliminates product loss.

It is a further object of this invention to provide a wood product that can be used to flavor aqueous beverages. It is a further object to provide a series of wood products able to impart different flavor characteristics to aqueous liquids. Another object is to provide a wood product that is easy to ship and use anywhere in the world. It is an object of this invention to multiply the efficiency of congener release and production for a given quantity of wood. Another object is to provide a wood product that may be recycled and used again as a flavor transfer agent for aqueous beverages.

Yet another object is to develop a beverage having improved and commercially acceptable organoleptic qualities. Another object is to provide ethanolic beverages having taste qualities indistinguishable from existing ethanolic beverages. Yet another object is to provide an ethanolic beverage containing novel organoleptic qualities.

SUMMARY

We have now discovered certain factors, heretofore unknown, that are crucial to the preparation of wood products useful to flavor aqueous food products. The prior art has stated that wood particles may be used to rapidly transfer flavor to ethanolic beverages. The art suggests that these wood particles may advantageously be roasted at various temperatures or washed in various liquids. Some have suggested that the wood particles should be roasted and washed. Unfortunately, the various wood particle preparation schemes have not produced wood particles that industry has found acceptable because of the inappropriate flavor profile of the products produced using the wood particles.

The failure of all previous processes is the result of the failure heretofore to discover that there are certain critical parameters in the wood particle production process. We have now discovered the existence of these critical parameters and have combined them in a process which for the first time produces wood particles which are capable of providing modifications in the flavor profile of a multitude of aqueous food products, especially distilled ethanolic beverages.

Contrary to published accounts, we have discovered that the sequence of process steps in the wood preparation process is critical. We have discovered that it is crucial to wash the particles prior to roasting.

The prior art has disclosed a single roast step, either before or after the wash step. We have discovered hot only that the sequence is critical but that a process containing multiple roast steps provides flavor profiles heretofore unobtainable.

Moreover we have discovered that the profile of the roast step plays a significant role in the flavor profile of the aqueous food product. We have discovered that the previously indicated upper roast temperature of 220° C. may be exceeded and that the changes that occur at such elevated temperature are beneficial to the final flavor profile of the product.

Various prior art processes have disclosed that the wash step could utilize either water or water with a minor portion of added ethanol. Contrary to prior reports, we have discovered that neither water nor water with a minor portion of added ethanol will produce wood particles that provide products with desired flavor profiles. We have discovered that it is crucial to provide a high ethanolic content liquid during the wood particle wash step.

As a result of our identifying the combination of critical steps, our process provides a wood product that transfers the desired flavor profile to the aqueous food product at least 100% more quickly than any product reported in prior art.

Our novel wood preparation process requires two steps in an ordered sequence:

1) reaction of wood particles with a high ethanolic content liquid and thereafter 2) roasting wood particles at an elevated temperature.

In a preferred variation of the basic process the wood particles are roasted prior to the reaction with the liquid medium.

In another variation, the wood particles are subjected to a higher temperature at the end of the roast prior to reaction with the high ethanolic liquid.

The wood product is used to impart flavors to aqueous liquids by contacting the liquid with the wood product for a period sufficient to transfer the flavoring agents to the liquid and, in some instances, to permit chemical interactions in the liquid to reach a desired maturity. This wood product may be used immediately to impart flavor to aqueous food products or it may be stored for later use. If stored properly, the product has an indefinite shelf life.

DETAILED DESCRIPTION

The first aspect of our invention relates to the preparation of wood for use in our flavor transfer process. Our process is not dependent on the genus or species of wood used. Historically, the woods used in imparting flavor components to ethanol containing beverages have been those used in barrel making. These and similar processes have used woods which have the requisite properties of strength, resilience and workability that allow the wood to be used in tight cooperage, as the principal historical method of obtaining the benefits of wood flavoring in the ethanolic beverage has been to age the beverage for long periods in wood barrels. White oak, red oak, chestnut oak, red or sweet gum, sugar maple, yellow or sweet birch, white ash, Douglas fir, beech, black cherry, sycamore, redwood, spruce bald cypress, elm and basswood have been used. These and other woods can be used in our process.

A number of these woods contribute flavors that are not generally recognized as desirable in flavoring ethanol beverages and for this reason the preferred genus of wood for use in our invention are Quercus species. Those Quercus species which are rich in tannins such as *Q. alba,* robur, and other European oaks are most desirable. Since white oak is considered to be the most satisfactory of the woods listed and is the primary wood used for whisky production this disclosure speaks generally of oak or white oak but is meant to include all woods useful for imparting flavor characteristics to ethanol containing liquids. A partial listing of those wood species appears in Singleton and in chapter 17 of the Handbook of Food and Beverage Stability, Charalambous, G.,ed., (NY 1986). The most preferred species for use in our process is *Quercus alba* or white oak.

Hardwoods average about 45% cellulose, 25% hemicelluloses (primarily xylans), 23% lignin, 7% acetyl groups, and 3–5% extractives including tannins [Singleton, Chemistry of Winemaking @ p. 258] Heartwood of white oak is higher in cellulose at 50%, with 22% hemicellulose, 32% lignin, 2.8% acetyl groups and 5–10% hot water extractives. This relatively high degree of tannins in oak is readily extracted into ethanol containing liquids and is an important contributor to flavor development during the contact of the ethanol containing liquid with the wood during aging.

Oak is considered to contribute odor and color as well as flavor to ethanol containing liquids. Vanillin syringaldehyde, γ-lactones and phenolic products derived from lignins are recognized as important in contributing a desirable odor to the liquids. Products resulting from the ethanolysis/hydrolysis and oxidation of lignin are important contributors to flavoring of liquids. Many other compounds, especially furfural derivatives and phenols, are present after barrel aging.

Whatever the variety of wood selected, we prefer to use wood which retains as many volatiles and extractables as possible. Therefore we prefer not to use wood that has been treated in a way that would diminish the amount of extractables, such as by steaming the wood for bending in barrel making. We prefer also to use heartwood for the larger quantity of extractables often found in the heartwood portion of the tree.

Seasoned wood, either air or kiln dried, is preferred. Freshly sawn wood may be used but will generally require reaction times different than those specified.

A convenient and inexpensive source of wood starting material is white oak derived from barrel making operation scraps. These white oak wood pieces are usually 2.5 cm thick, 1.75–10 cm wide, and 0.15–1 m long. We prefer to reduce these wood pieces in size by cutting into pieces so as to expose both the ring and ray features of the oak. This may be conveniently done by sawing parallel with the grain into sticks 1.25–2 cm$^2$ and the original length, then cutting across the grain to 0.3–0.45 cm thickness such that the wood pieces are roughly 1.25 to 2 cm$^2$ by 0.3 to 0.45 cm thick. A final cut along the ray gives pieces 0.15–0.45 cm by 0.3–0.45 cm.

Any conventional method of comminuting the wood into roughly equivalent small pieces may be utilized. It will be recognized that smaller pieces will result in decreased reaction times, larger pieces in longer reaction times and that the size of the wood pieces is a matter of convenience and not crucial to the operation of our invention.

In one embodiment of our invention, comminuted dry wood pieces are subjected to a first roasting step in which the wood pieces are roasted in unsealed cylinders in the presence of oxygen. The quantity of oxygen present in air is sufficient for the roasting step, although an oxygen enriched or partially oxygen depleted atmosphere may provide beneficial qualities to the roasted wood particles.

There are three parameters that are key to the success of our process. The first parameter is the rate at which heat is applied to the wood particles. If the heating takes place in too short a period of time the wood particles carbonize. It is thus required that the heat gradient be such that the temperature rise is no greater than approximately 30° C. per minute, desirably no greater than approximately 20° C. per minute and preferably no greater than about 5° C. per minute for regular roasting. For spikeheat treatment the temperature rise should be no greater than about 25° C. per minute, desirably no greater than approximately 13° C. per minute, preferably no greater approximately 9° C. per minute.

The second important parameter is the maximum temperature reached in the roast process. The roast step is ineffective if the wood chips do not reach a minimum temperature of at least about 100° C. If the temperature exceeds 300° C. the chips char and become unusable. The maximum temperature that may be used is dependent not only on the absolute value of the temperature but also on the time during which the temperature is maintained. Thus, it will be recognized that for each wood variety and for each different flavor profile desired, there is a combination of temperature and time that will yield optimal results.

Within the wide temperature range of operability, we prefer, to obtain the most commonly useful flavor profiles, to roast at a temperature in the range of from about 100° C. to about 240° C., most preferably at a temperature in the range of from about 120° C. to about 200° C.

The third significant parameter relating to the first roasting step is the duration of the roast. At a specific roast temperature and duration we have found that certain desirable compounds are prepared for extraction from the wood (and subsequent reaction with the ethanolic liquid) over different time periods. We have found that at a temperature in the range of from about 120° C. to about 200° C. acceptable results are obtained in the period of from about one (1) hour to about twenty (20) hours or more, preferably from about one and one-half (1.5) hours to about nine (9) hours.

For certain phenolic compounds, aromatic aldehydes and some higher esters, we have found that it is useful to increase the roast temperature significantly beyond the ordinary temperature for short periods of time. This burst of extra heat (spikeheat treatment) will raise the temperature of the roast a minimum of about ten (10)° C. and will, in general, last for a period of from about one (1) minute to about thirty (30) minutes, preferably for a period of from about one (1) to about twenty (20) minutes (from the commencement of temperature rise to the maximum temperature at the end of the spike) and will increase the temperature to as high as about 300° C., preferably below about 285° C., depending on the flavor profile desired. We have discovered that it is most advantageous to provide this "spike" of high heat at the very end of the roast process.

At the completion of the first roast the heat source is removed and the wood allowed to return to ambient temperature. We prefer to quickly cool the wood. When cool, the wood product may be kept indefinitely in sealed containers.

The prepared wood product from the first roast or, in a second alternative embodiment of our invention, comminuted dry wood particles from the wood preparation step, are then subjected to a first "wet" ethanolysis/hydrothanolysis/extraction step during which undesirable taste components are removed from the treated wood and desired congeners are prepared for extraction and reaction. During this ethanolysis/hydroethanolysis/extraction step the wood particles from the first roast step or the wood preparation step is contacted with an ethanol containing liquid.

It is especially important to maintain a proper ethanol/water ratio in the ethanol containing liquid. In general we have found that the ethanol content in the liquid may vary from 20% (40 proof) to 95% (190 proof). We prefer to maintain the ethanol content of the liquid in the range of from about 50% to about 80% ethanol for distilled liquids. Water must be present in the liquid.

The ethanol containing liquid may be any liquid containing ethanol and water in the specified proportions. Fermentation liquids, distillates, mixtures thereof or mixtures of synthetic ethanol and water may all be used.

The quantity of wood to volume of liquid can vary widely. We have found that a generally useful ratio of wood to liquid is up to about 4 g of wood, preferably from about 0.75 g to about 1.25 g of wood per 10 ml of liquid containing 62.5 percent ethanol. The ratio of wood to liquid may be increased substantially if recycled wood is used.

The duration of this wood wash step is dependent upon the profile of the wood roast step. Where the wood roast step has been conducted at a relatively low temperature and for a relatively short period, this wood wash step will require a shorter period. Where the wood roast step has been conducted at a relatively high temperature and for a relatively long period and especially where spikeheat has been utilized, the wood wash step will require a longer period. In general, the wood wash step will require a minimum of about 2 hours. We have discovered that excellent results are obtained when the duration of the wood wash step is from about 4 to about 24 hours. For wood roasted at a temperature in the range of from about 190° C. to about 280° C. we prefer a duration of approximately 6 hours to approximately 24 hours. Where the wood roast temperature is below approximately 190° C. we prefer a wood wash of approximately 2.5 hours to 12 hours, preferably approximately 4 hours.

Notwithstanding the above specified durations, in those instances where it is desired to remove the maximum quantity of aromatic aldehydes the duration of the wood wash step may profitably be extended up to or beyond 24 hours.

The wood wash step may be conducted at ambient temperature. The temperature may advantageously be increased to 78° C. or to as high as 100° C. It is preferable to conduct the wood wash at a temperature in the range of from about ambient to about 55° C. or more, preferably from ambient to 40° C.

The reactants may be agitated using a low shear mixing apparatus to further increase the speed and efficiency of the wood wash step. It will be recognized that the appropriate amount of agitation for a specific product, if any, can be determined experimentally and easily varied depending on the required flavor profile of the product.

The reaction is sensitive to the presence of light. It is desirable to accomplish the solid—liquid reaction steps of our invention in a low light or no light environment.

When the wood wash has been completed, it is desirable to separate the solids from the liquid and to distill the liquid for reuse. The wet wood particles are then put in sealed non-reactive containers until roasted or reroasted.

The wood product from the wash step is then roasted. An important parameter in the roast profile is the temperature reached in the roast process. The roast step is ineffective if the wood chips do not reach a minimum temperature of at least about 100° C. If the temperature exceeds about 220° C. the chips become unusable. The secondary roast temperature that is used is a function of the absolute value of the temperature and of the time during which that temperature is maintained. Thus, it will be recognized that for each wood variety and for each different flavor profile desired, there is a combination of temperature and time that will yield optimal results.

Within the wide temperature range of operability, we prefer, to obtain the most commonly useful flavor profiles, to roast at a temperature in the range of from about 100° C. to about 220° C. We most prefer to utilize a temperature in the range of from about 120° C. to about 200° C. In general, within these parameters, when the wood particles have been subjected to a first roast, it is useful to reroast the wood at the same temperature as the first roast.

A second parameter is the rate at which heat is applied to the wood particles. We prefer to use a moderate heat gradient. Preferably, the temperature rise is no greater than approximately 7° C. per minute, most preferably approximately 3.0 to 5.50° C. per minute.

The third significant parameter to the roasting step is the duration of the roast. At any given roast temperature we have found that certain volatile compounds are prepared for extraction and reaction in the flavor transfer step. The duration of the secondary roast is beneficially in the range of from about one (1) hour to about five (5) hours.

In general, for wood particles that have been subjected to a first roast where the maximum temperature of the roast did not exceed 190° C. (low and medium roasts), a second roast duration of from about 1.5 hours to about 2.5 hours is preferable. Where the wood was subjected to a first roast where the temperature was in excess of 190° C. (high roasts) and in particular where the first roast contained a spike, a duration of from about 1.5 hours, preferrably from about 2.5 hours to about 5 hours or more is desirable.

At the completion of the roast the heat source is removed and the wood allowed to return to ambient temperature. We prefer to quickly cool the wood particles. When cool, the wood product may be used immediately or may be placed in sealed inert containers and kept indefinitely.

The finished wood product may be used to flavor aqueous food products. The food products may be acidic liquid food products such as vinegar or acidic beverages such as carbonated beverages or fruit juices. The acidic liquid may be any liquid having a pH above about 1.0, preferably above about 2.0. The food products need not be acidic. Water with a neutral pH may be flavored and used to enhance the flavor of food products or as a component of a beverage. A particularly useful embodiment of our invention is the use of the wood product to enhance the flavor of ethanolic liquids. In this embodiment, the wood product from the roast is contacted with an ethanol containing liquid during which desirable taste components react with oxygen, ethanol and water and are transferred from the treated wood particles to the ethanol containing liquid.

The ethanol containing liquid may be any liquid containing ethanol and water in specified proportions. Fermentation liquids, distillates or mixtures thereof or of synthetic ethanol and water may all be used. The base for the fermentation may be a grain such as corn, wheat, barley, rye or the like, a root or tuber such as potato or beet or the like, a fruit such as grape, apple, cherry, orange or the like or other plant part such as sugar cane, cactus or the like. The organoleptic qualities of the final product are a function of the quality of the ethanol containing liquid as well as the wood chip used. The higher the quality of the ethanol containing liquid, the higher the quality of the final product. The particular ethanol containing liquids used, such as those ethanol containing liquids appropriate to each of the commonly recognized categories of beverages, such as whiskies of various types, rum, brandies, eau de vie, tequila, vodka, wines, fortified wines and liqueurs will provide different results when used with the same wood chip. It is therefore necessary to match the particular ethanol containing liquid with a wood chip having the desired flavoring qualities. Our process may be used to make palatable marginal products as well as increasing the quality of excellent products.

In addition to reproducing the organoleptic qualities of acidic, ethanolic or neutral aqueous liquids which have been aged in wood barrels for extended periods of up to 20 years and more, our process permits the development of designed beverages or other products having a flavor profile determined by the producer. These new beverages or food products may be produced by combining the ethanolic, acidic or neutral aqueous liquids with the wood particles of our invention that have been processed to highlight specific components of the complete flavor profile desired by the designer.

We have discovered that it is especially important to maintain a proper ethanol/water ratio in the ethanol containing liquid. In general we have found that the ethanol content in the liquid may vary from 7.5% (15 proof) to 95% (190 proof). We prefer to maintain the ethanol content of the liquid in the range of from about 55% to about 85% ethanol for distilled beverages such as whiskey, wine distillates and rum. Water must be present in the liquid.

The quantity of wood to volume of liquid can vary widely. For ethanolic liquids other than wine, we have found that a useful range of liquid to wood is in the range of from about 5 to about 20 ml of liquid containing 62.5 percent ethanol per gram of wood. The most beneficial ratio of liquid to wood is in the range of from about 10 to about 20 ml liquid containing 62.5 percent ethanol per gram of wood. The ratio of liquid to wood may be decreased to develop intensified flavors if so desired. For wine, the ratio of liquid to wood may be up to about 300 ml or more of wine per gram of wood product, preferably about 100 ml to about 200 ml of wine per gram of wood. For acidic and neutral aqueous liquids, the ratio of liquid to wood may be up to about 40 ml/g or more of liquid per gram of wood particles; preferably from about 3.75 to about 30 ml/g.

The duration of the flavor transfer step is dependent upon the profile of the wood preparation steps and upon the temperature at which it is conducted. In general, for ethanolic liquids other than wine, the flavor transfer step will require from about 50 to about 1500 hours; for wine from about 50 hours to about 330 hours. For acidic and neutral aqueous liquids a minimum of about 5 minutes is required; we prefer a duration of up to about 200 hours for acidic liquids and up to about 110 hours for neutral liquids. We have discovered that excellent results are obtained when the duration of this flavor transfer step is from about 55 to about 1250 hours for ethanolic liquids other than wine; for wine from about 55 hours to about 250 hours. For wood roasted at a low temperature we prefer a duration of approximately 75 to about 1000 hours for ethanolic liquids other than wine. For wood roasted at a high temperature we prefer a duration of approximately 55 to about 1000 hours for ethanolic liquids other than wine.

The time at which the flavor transfer process is complete is determined by organoleptic evaluation. The time of peak maturation at which the flavor enhanced liquid should be removed from the wood particles occurs within a range of from about 90 to about 1000 hours for ethanolic liquids other than wine.

The temperature of the reactants during the flavor transfer step is a significant factor in determining the organoleptic qualities of the flavor enhanced ethanol containing product. In general, the flavor transfer step is conducted at a single temperature although it may be conducted at a first higher temperature for a first period and then at a second lower temperature for a second period, or with other temperature variations as desired. The reaction may be allowed to occur at ambient temperature although we prefer a temperature of between about ambient and 55° C. For ethanolic liquids other than wine, we prefer to conduct the flavor transfer step at a temperature above ambient to increase the efficiency and rate of the process. It is not however required that the temperature be increased above ambient; the reaction proceeds at a slower rate but without difficulty at or below ambient. In general, satisfactory results are obtained at a temperature in the range of from about 20° C. to about 45° C.; a temperature in the range of from about 35° C. to about 40° C. is most preferred. For wine, we prefer to conduct the flavor transfer step at ambient temperature. For acidic and neutral liquids, the flavor transfer step may be conducted at any convenient temperature.

Preferably, for ethanolic liquids other than wine, oxygen must be present during the flavor transfer step. We have found that an oxygen level in excess of that in air is desirable for the most efficient operation of our process. The additional quantities of oxygen beneficial to the process may be provided in any one of many ways. One easy and convenient method is to only partially fill the reaction vessel with reactants and to provide an oxygen enriched atmosphere over the reactants in the vessel. We prefer to fill the reaction vessel no more than approximately 40 percent full and to provide a pure oxygen atmosphere over the reactants. Oxygen may of course be provided in any other conventional way. Wine is a special case; oxygen should not be added when the liquid is wine.

The flavor transfer step may be conducted without agitation. Agitation does however increase the efficiency and rate of the reaction. In the case where the liquid is wine, an unagitated reaction is preferred.

Other variations of the flavor transfer step include the provision of two or more different types of wood particles and concurrent or sequential contacting of the liquid with the wood particles. Thus, the liquid may be contacted with a first charge of one or more types of wood particles and then contacted with a second charge of the same or different type of wood particle or particles.

When the desired organoleptic characteristics have been obtained the liquid is separated from the wood chips and transferred to inert containers for storage. The wood chips may be recycled and reused a number of times before their flavor enhancing ability is exhausted.

Our invention is further described by the following non-limiting examples.

Example A-1

Pieces of white oak, scrap from the barrel making process, were obtained from a barrel maker. A quantity of such pieces weighing 50 gm was sawn into pieces that roughly averaged 0.45 cm$^3$ in size. The saw cuts were made in a manner such that both the ray and ring elements of the oak were exposed. The wood was placed in a closed, unsealed canister fastened to a spit in a rotisserie type oven and the heat was turned on. The rotisserie rotated at 5 RPM under one 1250 watt resistance coil. The temperature slowly increased over a period of 20 minutes from the ambient temperature to a temperature of 121° C. The temperature was maintained for a period of 3 hours. The heat was then turned off and the wood pieces were fan cooled to room temperature. When the product was cool it was placed in a sealed container and stored for future processing.

Example A-2

The process of Example A-1 was repeated except that the maximum temperature was 193° C. and the duration of heat application was 9 hours. The average heat gradient from ambient to the operating temperature was 5° C. per minute. Immediately following the 9 hour roast and without cooling, the oven was turned to high heat for 17 minutes. The temperature gradient was approximately 10° C. per minute for the first 4 minutes to approximately 240° C., 5° C. per minute for the second 4 minutes to approximately 260° C. and 2.5° C. per minute to a peak temperature of approximately 280° C. The wood was then removed from the oven and fan cooled to approximately 93° C. within 4 minutes.

Example A-3

The process of Example A-1 was repeated except that the rotisserie rotated under two 1250 watt resistance coils until the temperature increased over a period of 5 to 6 minutes to a temperature of 150° C. after which the oven was switched to standard heat (one coil) and the temperature was maintained for a period of 1.5 hours. Immediately following the 1.5 hour roast and without cooling, the high heat treatment of Example A-2 was used.

Example A-4

The process of Example A-1 was repeated except that the maximum temperature was 193° C. and the duration of heat application was 4.5 hours.

Example A-5

The process of Example A-1 was repeated except that the maximum temperature was 150° C. and the duration of heat application was 9.0 hours.

Example A-6

The process of Example A-2 was repeated except that the temperature was 177° C. for an initial heat application of 18 hours, followed by a maximum temperature of 193° C. for 2 hours; the duration of the high heat spike was 5 minutes and the peak temperature was 243° C.

Example A-7

The process of Example A-1 was repeated except that the maximum temperature was 150° C. and the duration of heat application was 6.0 hours.

Example A-8

The process of Example A-3 was repeated except that the maximum temperature was 150° C., the duration of heat application was 1.5 hours, the duration of the high heat spike was 5 minutes and the peak temperature was 221° C.

Example A-9

The process of Example A-3 was repeated except that the maximum temperature was 150° C., the duration of heat application was 1.5 hours, the duration of the high heat spike was 11.5 minutes and the peak temperature was 256° C.

Example A-10

The process of Example A-2 was repeated except that the maximum temperature was 193° C., the duration of heat application was 1.5 hours, the duration of the high heat spike was 5 minutes and the peak temperature was 243° C.

Example A-11

The process of Example A-1 was repeated except that the maximum temperature was 182° C. and the duration of heat application was 5.5 hours.

Example A-12

The process of Example A-1 was repeated except that the maximum temperature was 175° C. and the duration of heat application was 5.0 hours.

Example A-13

The process of Example A-2 was repeated except that the maximum temperature was 193° C., the duration of heat application was 4.5 hours, the duration of the high heat spike was 16 minutes and the peak temperature was 271° C.

Example A-14

The process of Example A-2 is repeated except that the maximum temperature is 100° C., the duration of heat application is 3.5 hours, the duration of the high heat spike is 3 minutes and the peak temperature is 160° C.

Example A-15

The process of Example A-1 is repeated except that the maximum temperature is 240° C. and the duration of heat application is 2.5 hours.

Example A-16

The process of Example A-2 is repeated except that the maximum temperature is 100° C., the duration of heat application is 2.5 hours, the duration of the high heat spike is 20 minutes and the peak temperature is 300° C.

Example A-17

The process of Example A-1 is repeated except that the maximum temperature is 121° C. and the duration of heat application is 3 hours.

Example B-1

The roasted wood product from Example A-1 (23 g) was placed in a 1000 ml sealed glass vessel. Two hundred sixty-three milliliters of grain neutral sprits, comprising 62.5% ethanol and 37.5% water, were added to the container. The reaction vessel was filled approximately 40% full by the solid/liquid mixture. The heat was turned on and the temperature reached 40° C. within 30 minutes. The temperature was maintained at 40° C. for 12 hours. The mixture was allowed to cool. The solids were separated and placed in a sealed container. The liquid was retained for redistillation and reuse.

Example B-2

The process of Example B-1 was repeated using wood from Example A-2 except that the maximum temperature was 40° C. and the duration of heat application was 12 hours following by an initial period of 12 hours at 25° C.

Example B-3

The process of Example B-1 was repeated using wood from Example A-3 except that the maximum temperature was 40° C. and the duration of heat application was 24 hours.

Example B-4

The process of Example B-1 was repeated using wood from Example A-4 except that the maximum temperature was 36° C. and the duration of heat application was 6 hours.

Example B-5

The process of Example B-1 was repeated using wood from Example A-5 except that the maximum temperature was 36° C. and the duration of heat application was 6 hours.

Example B-6

The process of Example B-1 was repeated using wood from Example A-6 except that the maximum temperature was 21° C. and the duration of heat application was 12 hours followed by an additional period of 12 hours at 40° C.

Example B-7

The process of Example B-1 was repeated using wood from Example A-7 except that the maximum temperature was 36° C. and the duration of heat application was 6 hours.

Example B-8

The process of Example B-1 was repeated using wood from Example A-8 except that the maximum temperature was 36° C. and the duration of heat application was 4 hours.

Example B-9

The process of Example B-1 was repeated using wood from Example A-9 except that the maximum temperature was 40° C. and the duration of heat application was 6 hours.

Example B-10

The process of Example B-1 was repeated using wood from Example A-10 except that the maximum temperature was 40° C. and the duration of heat application was 6 hours.

Example B-11

The process of Example B-1 was repeated using wood from Example A-11 except that the maximum temperature was 38° C. and the duration of heat application was 6 hours.

Example B-12

The process of Example B-1 was repeated using wood from Example A-12 except that the maximum temperature was 38° C. and the duration of heat application was 6 hours.

Example B-13

The process of Example B-1 was repeated using wood from Example A-13 except that the maximum temperature was 21° C. and the duration of heat application was 12 hours followed by an additional period of 12 hours at 40° C.

Example B-14

The process of Example B-1 was repeated except that the wood particles did not receive a primary roast.

Example B-15

The process of Example B-1 is repeated using wood from Example A-15 except that the maximum temperature is 36° C. and the duration of heat application is 4 hours.

Example B-16

The process of Example B-1 is repeated using wood from Example A-16 except that the duration of heat application is 8 hours.

Example B-17

The process of Example B-1 is repeated using wood from Example A-17 except that the duration of heat application is 10 hours.

Example B-18

The process of Example B-1 is repeated using wood from Example A-13 except that the maximum temperature is 55° C. and the duration of heat application is 12 hours.

Example C-1

Twenty-three grams of the treated wood from Example B-1 in a perforated aluminum foil packet was placed in an oven and the heat turned on. The temperature slowly increased over a period of 30 minutes from the ambient temperature to a temperature of 121° C. The temperature was maintained for a period of 1.5 hours. The heat was then turned off and the wood pieces were forced air cooled to room temperature. When the product was cool it was placed in a sealed container and stored for future use.

Example C-2

The process of Example C-1 was repeated using wood prepared per Example B-2 except that the maximum temperature was 188° C. and the duration of heat application was 5 hours.

Example C-3

The process of Example C-1 was repeated using wood prepared per Example B-3 except that the maximum temperature was 188° C. and the duration of heat application was 5 hours.

Example C-4

The process of Example C-1 was repeated using wood prepared per Example B-4 except that the temperature was 177° C. and the duration of heat application was 1.5 hours.

Example C-5

The process of Example C-1 was repeated using wood prepared per Example B-5 except that the temperature was 150° C. and the duration of heat application was 1.5 hours.

Example C-6

The process of Example C-1 was repeated using wood prepared per Example B-6 except that the temperature was 177° C. and the duration of heat application was 5 hours.

Example C-7

The process of Example C-1 was repeated using wood prepared per Example B-7 except that the temperature was 150° C. and the duration of heat application was 1.5 hours.

Example C-8

The process of Example C-1 was repeated using wood prepared per Example B-8 except that the temperature was 150° C. and the duration of heat application was 1.5 hours.

Example C-9

The process of Example C-1 was repeated using wood prepared per Example B-9 except that the temperature was 177° C. and the duration of heat application was 1.5 hours.

Example C-10

The process of Example C-1 was repeated using wood prepared per Example B-10 except that the temperature was 177° C. and the duration of heat application was 1.5 hours.

Example C-11

The process of Example C-1 was repeated using wood prepared per Example B-11 except that the temperature was 150° C. and the duration of heat application was 1.5 hours.

Example C-12

The process of Example C-1 was repeated using wood prepared per Example B-12 except that the temperature was 150° C. and the duration of heat application was 1.5 hours.

Example C-13

The process of Example C-1 was repeated using wood prepared per Example B-13 except that the temperature was 188° C. and the duration of heat application was 1.5 hours.

Example C-14

The process of Example C-4 was repeated using wood prepared per Example B-14.

Example C-15

The process of Example C-1 is repeated using wood prepared per Example B-15 except that the temperature is 100° C. and the duration of heat application is 2.5 hours.

Example C-16

The process of Example C-1 is repeated using wood prepared per Example B-16 except that the temperature is 193° C. and the duration of heat application is 2.5 hours.

Example C-17

The process of Example C-1 is repeated using wood prepared per Example B-17 except that the temperature is 177° C. and the duration of heat application is 2.5 hours.

Example C-18

The process of Example C-3 is repeated using wood prepared per Example B-18.

Example D-1

Ten (10) grams of the reroasted wood product from Example C-1 was placed in a glass container and 0.1 liters of a liquid containing 62.5% ethanol and 37.5% water were added. The solid/liquid weight/volume ratio was 1 gm/10 ml. A Teflon tube was inserted into the flask approximately 10 cm above the surface of the mixture and oxygen at the rate of approximately 6 liters per minute was pumped into the flask for 15–30 seconds to enrich the atmosphere. The tube was removed and the flask sealed. The heat and agitator were turned on. The temperature slowly increased over a period of 60 minutes from the ambient temperature to a temperature of 45° C. The temperature was maintained for a period of 110 hours. The heat was then turned off and the solution was allowed to cool to room temperature. When the temperature reached ambient temperature, the aged distillate product was removed and filtered.

Example D-2

The process of Example D-1 was repeated except that the wood used was prepared per Example C-2 and the solid/liquid weight/volume ratio was 0.85 gm/10 ml.

Example D-3

The process of Example D-1 was repeated except that the wood used was prepared per Example C-3 and the solid/liquid weight/volume ratio was 1.2 gm/10 ml.

Example D-4

The process of Example D-1 was repeated except that the wood used was prepared per Example C-4, the duration of heat application was 70 hours, and the solid/liquid weight/ volume ratio was 1 gm/10 ml.

Example D-5

The process of Example D-1 was repeated except that the wood used was prepared per Example C-5, and the solid/liquid weight/volume ratio was 1.2 gm/10 ml.

Example D-6

The process of Example D-1 was repeated except that the wood used was prepared per Example C-6, the duration of heat application was 86 hours, and the solid/liquid weight/volume ratio was 0.75 gm/10 ml.

Example D-7

The process of Example D-1 was repeated except that the wood used was prepared per Example C-7, and the solid/liquid weight/volume ratio was 1.2 gm/10 ml.

Example D-8

The process of Example D-1 was repeated except that the wood used was prepared per Example C-8, and the solid/liquid weight/volume ratio was 1.2 gm/10 ml.

Example D-9

The process of Example D-1 was repeated except that the wood used was prepared per Example C-9, and the solid/liquid weight/volume ratio was 1 gm/10 ml.

Example D-10

The process of Example D-1 was repeated except that the wood used was prepared per Example C-10, and the solid/liquid weight/volume ratio was 1.1 gm/10 ml.

Example D-11

The process of Example D-1 was repeated except that the wood used was prepared per Example C-11, and the solid/liquid weight/volume ratio was 1.1 gm/10 ml.

Example D-12

The process of Example D-1 was repeated except that the wood used was prepared per Example C-12, and the solid/liquid weight/volume ratio was 1.25 gm/10 ml.

Example D-13

The process of Example D-1 was repeated except that the wood used was prepared per Example C-13, the duration of heat application was 90 hours, and the solid/liquid weight/volume ratio was 0.75 gm/10 ml.

Example D-14

The process of Example D-1 was repeated except that the wood used was prepared per Example C-14, the duration of heat application was 124 hours, and the solid/liquid weight/volume ratio was 1.2 gm/10 ml.

Example D-15

The process of Example D-1 is repeated except that the wood used is prepared per Example C-15, the duration of heat application is 138 hours, and the temperature is 40° C.

Example D-16

The process of Example D-1 is repeated except that the wood used is prepared per Example C-16, the duration of heat application is 108 hours, the temperature is 40° C. and the solid/liquid weight/volume ratio is 0.8 gm/10 ml.

Example D-17

The process of Example D-1 is repeated except that the wood used is prepared per Example C-17, the duration of heat application is 90 hours, and the solid/liquid weight/volume ratio is 0.8 g/10 ml.

Example D-18

The process of Example D-1 is repeated except that the wood used is prepared per Example C-18.

Example D-19

"Chip Mixes" involve a combination of different wood preparations in varying portions. This mix of wood preparations is used en masse to age a batch of distillate.

Ten (10) grams of the combination of wood products comprising 2 parts Sample ABC-14; 1 part ABC-3 and 2 parts ABC-7 was placed in a glass container and 0.1 liters of a liquid containing 62.5% ethanol and 37.5% water were added. The solid/liquid weight/volume ratio was 1 gm/10 ml. The heat and agitator were turned on. The temperature slowly increased over a period of 60 minutes from the ambient temperature to a temperature of 45° C. The temperature was maintained for a period of 110 hours. The heat was then turned off and the solution was allowed to cool to room temperature. When the temperature reached ambient temperature, the aged distillate product was removed and filtered.

Example D-20

Ten (10) grams of the combination of wood products comprising 1 parts Sample ABC-8; 1.5 part ABC-3 and 0.75 parts ABC-9 was placed in a glass container and 0.1 liters of a liquid containing 62.5% ethanol and 37.5% water were added. The solid/liquid weight/volume ratio was 1 gm/10 ml. The heat and agitator were turned on. The temperature slowly increased over a period of 60 minutes from the ambient temperature to a temperature of 45° C. The temperature was maintained for a period of 110 hours. The heat was then turned off and the solution was allowed to cool to room temperature. When the temperature reached ambient temperature, the aged distillate product was removed and filtered.

Example D-21

Wood chips are not fully depleted in the first 110 hours. Twenty (20) grams of the reroasted wood product identified as ABC-7 was placed in a glass container and 0.1 liters of a liquid containing 62.5% ethanol and 37.5% water were added. The solid/liquid weight/volume ratio was 2 gm/10 ml. The heat and agitator were turned on. The temperature slowly increased over a period of 60 minutes from the ambient temperature to a temperature of 45° C. The temperature was maintained for a period of 110 hours. The heat was then turned off and the solution was allowed to cool to room temperature. When the temperature reached ambient, the aged distillate product was removed and filtered.

Flavors were milder but sufficient to cover distillate rawness. Some versions seem well suited to the production of beverages normally aged in "reused oak barrels", like scotch, some bourbons and Canadian whiskeys.

Example D-22

Multiple Aging Sequences involve the aging of a single batch of distillate by sequential exposure to different single wood preparations, One may also age the same distillate twice with two separate but same charges of wood. This produces very intense and pure single flavor characters.

Ten (10) grams of the reroasted wood product identified as ABC-13 was placed in a glass container and 0.1 liters of a liquid containing 62.5% ethanol and 37.5% water were added. The solid/liquid weight/volume ratio was 1 gm/10 ml. The heat and agitator were turned on. The temperature slowly increased over a period of 60 minutes from the ambient temperature to a temperature of 45° C. The temperature was maintained for a period of 90 hours. The heat was then turned off and the solution was allowed to cool to room temperature. When the temperature reached ambient temperature, the aged distillate product was removed. A new charge often (10) grams of the chip type ABC-13 was added to the liquid and the process repeated. This wood chip variety used in this manner produced a wonderful vanillin character.

Example D-23

One half (0.5) gram of a combination of wood products comprising 1 part Sample #1; 1 part Sample #5 and 1 part Sample #13 was placed in a glass container and 0.1 liters of Gallo Hearty Burgundy wine, a red wine produced by E & J Gallo Wineries was added. The solid/liquid weight/volume ratio was 0.5 gm/100 ml. The wood chips were maintained in contact with the liquid for a period of 192 hours. No oxygen, heating or agitation was used. The aged product was removed and filtered. The finished product had a pleasant oak (but not woody) nuance; a much improved vanillin finish; a mellower, smoother character and no destruction of the "fruit character" of the wine.

TABLE 1

Results - Utilization of Representative Process Parameters

| Example. No. | Organoleptic Product Description |
|---|---|
| ABC-1 | heavy mint, vanilla |
| ABC-2 | phenolics, smokey, char |
| ABC-3 | bourbon flavored char, sweet |
| ABC-4 | caramel, vanilla, slight mint |
| ABC-5 | vanilla, caramel, light character |
| ABC-6 | heavy caramel, sugar sweet, sherry |
| ABC-7 | light caramel, vanilla, minty |
| ABC-8 | spearmint, vanilla, caramel |
| ABC-9 | violets, smoked wood, peppery, peppermint, vanilla |
| ABC-10 | mint, violet, vanilla |
| ABC-11 | vanilla, mint |
| ABC-12 | mild caramel, vanilla, sweet wood |
| ABC-13 | char, light vanilla |
| BC-14 | oak wood, light caramel, light mint |
| ABC-15 | caramel, minty, vanilla |
| ABC-16 | caramel, spearmint, mint |
| ABC-17 | heavy char, sweet, vanilla |
| ABC-18 | light mint, light vanilla |

We claim:

1. A wood product capable of flavoring ethanol-containing beverages selected from the group consisting of whiskies, rum, brandy, armagnac, cognac, and eau de vie prepared by the process comprising:

(a) comminuting wood pieces obtained from a species of tree useful in imparting flavor components to said ethanol-containing beverages;

(b) extracting taste components undesirable in said ethanol-containing beverages from the wood pieces of step (a) using wash comprising at least about 50% to at most about 95% ethanol in water; and (c) roasting the washed wood pieces of step (b) at a temperature of at least about 100 Celsius.

2. A product according to claim 1, wherein the process additionally comprises a further roasting step which comprises:

roasting the comminuted wood pieces of step (a) at a temperature of between 100 to 240 Celsius for a period of from about one hour to about 20 hours prior to the extracting step (b).

3. A product prepared according to the process of claim 2, wherein the further roasting step therein additionally comprises:

increasing the temperature during the final portion of said roasting step to a temperature up to about 300 Celsius.

4. A method of using the product according to claim 1 to improve the flavor of a pre-determined quantity of said ethanol-containing beverage which comprises:

contacting an amount of said wood product with said ethanol-containing beverage for a period of time effective to produce said improvement in flavor.

5. A method of using the product according to claim 2 to improve the flavor of a pre-determined quantity of said ethanol-containing beverage which comprises:

contacting an amount of said wood product with said ethanol-containing beverage for a period of time effective to produce said improvement in flavor.

6. A method of using the product according to claim 3 to improve the flavor of a pre-determined quantity of said ethanol-containing beverage which comprises:

contacting an amount of said wood product with said ethanol-containing beverage for a period of time effective to produce said improvement in flavor.

* * * * *